May 25, 1954  H. A. THRUSH  2,679,148
FLEXIBLE COUPLING
Filed Sept. 22, 1952
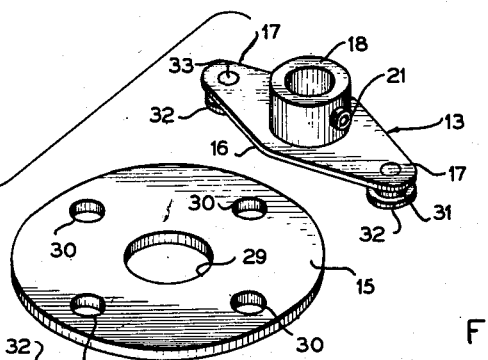
FIG. 1
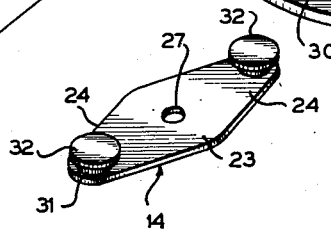
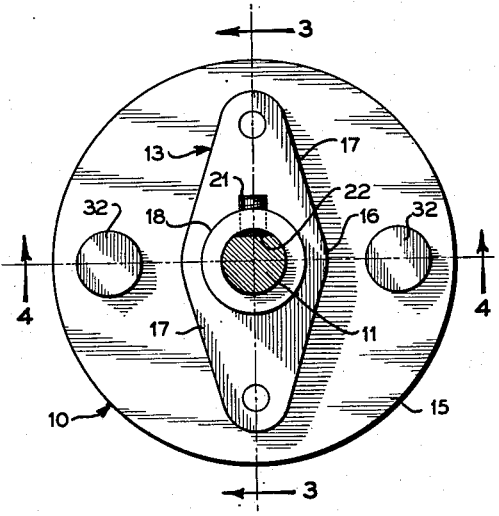
FIG. 2
FIG. 3
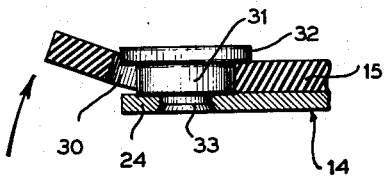
FIG. 5
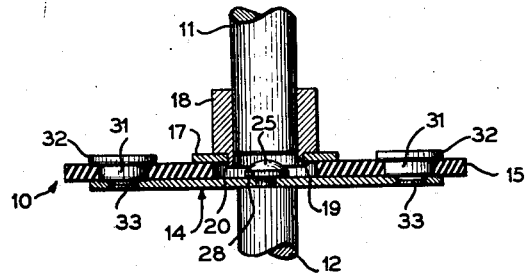
FIG. 4
INVENTOR
H. A. THRUSH
ATTORNEY Patented May 25, 1954

2,679,148

UNITED STATES PATENT OFFICE 2,679,148

FLEXIBLE COUPLING

Homer A. Thrush, Peru, Ind., assignor to H. A. Thrush & Company, Peru, Ind., a corporation of Indiana Application September 22, 1952, Serial No. 310,752

2 Claims. (Cl. 64—13)

This invention relates to machine elements and more particularly to a flexible means for coupling a power shaft to a driven shaft with such shafts in close axial alignment, the coupling also serving to correct for any minor misalignment between such shafts and to prevent the transmission of mechanical noises from one shaft to the other.

Heretofore many types of flexible couplings have been designed but the vast majority of such machine elements utilize relatively large hubs for connecting the separable parts of the coupling to the driving and driven shafts, respectively, and as a result of the employment of such hubs the supporting bearings of the two shaft members are spaced apart a relatively great distance. In addition, the majority of prior art couplings have utilized relatively hard substances for transmitting torque from one shaft to another and the inherent rigidity of the substances commonly employed has served to transmit mechanical noises between the two shafts. This noise problem is of extreme importance under all circumstances and particularly so where the installation is intended for residential or home use, as in circulating pumps in heating systems, or the like, where such noise as is transmitted from the driving or motor shaft to the pump shaft will be carried through the house piping system to the various radiators, thereby creating an objectionable noise level throughout the rooms of the house.

It is likewise important that the bearings supporting the drive and driven shafts be located in close end-to-end relationship to permit the designing of more compact units. This is of particular importance in installations of the character referred to hereabove where, in many instances, space is at a premium and a particularly compact unit is highly desirable.

Further, in couplings of the character with which we are presently concerned, the assembly and/or disassembly of the coupling, whether in an initial installation or for purposes of effecting a repair to the motor or the like or for purposes of replacing the torque transmitting element, has been a time consuming and costly operation requiring a skilled mechanic and appropriate tools. The present invention is especially concerned with a novel coupling which may be readily and conveniently assembled or disassembled without requiring skilled labor or the use of tools other than a simple screw-driver.

The present invention is a continuation-in-part of my pending application Serial No. 292,495 filed June 9, 1952, and is an improved modification of the flexible coupling disclosed in said application.

It is, therefore, a major object of this invention to provide a flexible coupling for connecting a power shaft and a driven shaft in which the power transmitting medium is manufactured from relatively soft, flexible material, thereby precluding the possibility of transmission of mechanical noises from one shaft to another and permitting the automatic correction of any relatively minor misalignment between the two shafts.

It is a further object of the present invention to provide a novel coupling of the class set forth which may be readily assembled and disassembled, requiring neither skilled labor nor special tools for such operations.

It is a still further object of the present invention to provide a novel coupling of the character with which we are here concerned, comprising a minimum quantity of separable elements which may be manufactured economically from inexpensive and readily available materials.

Further objects and advantages of the invention will be apparent from the following description taken in conjunction with the accompanying drawing wherein:

Fig. 1 is an exploded perspective view of the several elements of a flexible coupling illustrating one embodiment of the present invention;

Fig. 2, a top plan view of the assembled coupling illustrating a power or drive shaft in section;

Fig. 3, a sectional view through the assembled coupling, taken on the line 3—3 of Fig. 2;

Fig. 4, a sectional view through the assembled coupling, somewhat similar to Fig. 3, taken on the line 4—4 of Fig. 2; and Fig. 5, a fragmentary detail view, on a slightly enlarged scale, illustrating the novel method of disassembling the coupling or separating the elements thereof.

With continued reference to the drawing, there is illustrated a flexible coupling 10 for connecting a power shaft 11 to a driven shaft 12 and transmitting torque therebetween. The several elements of the coupling comprise a driving spider 13, a driven spider 14, and a relatively thin disk 15 positioned between said spiders and manufactured from suitable flexible material.

Preferably the driving spider 13 includes a centrally located enlarged portion 16 and diametrically opposed arms 17 extending outwardly therefrom. The enlarged central portion 16 is secured to a hub member 18 in any desired manner, one convenient manner of accomplishing this assembly being illustrated as comprising a lower extremity 19 on said hub of reduced diameter and receivable within a centrally located aperture in the enlarged portion 14 of the driving spider. Desirably, the extremity 19 of the hub projects through such aperture and is then peened over as indicated at 20 to securely mount thereon the spider 13 and prevent relative rotation therebetween.

Desirably the spider 13 is formed from relatively thin sheet material of sufficient strength and thickness to transmit the required power without possibility of distortion. The hub 18 may be secured against rotation on the power drive shaft 11 by means of a set screw 21, or the like, threadedly received in the hub and engaging a flat surface 22 provided upon the drive shaft at the lower extremity thereof. Obviously, any other suitable means may be employed for connecting the hub to the drive shaft 11.

The driven spider 14 is preferably similar to the spider 13 in exterior conformation as well as material and includes a centrally located enlarged portion 23 and diametrically opposed arms 24 extending outwardly therefrom. Any suitable means may be provided for securing the spider 14 to the extremity of the driven shaft 12, a preferred embodiment of such fastening means comprising a machine screw or the like 25 receivable within an axially located, screw-threaded recess 26 provided in the extremity of the driven shaft. As will be more readily apparent from an examination of Fig. 3 of the drawing, the machine screw or fastening element 25 passes through a centrally located aperture 27 provided in the enlarged portion 21 of the driven spider 14, a lock washer 28 or the like being provided to insure against inadvertent separation as between the spider 14 and the driven shaft 12.

Positioned between the driving spider 13 and the driven spider 14 is a relatively thin disk 15 formed from any suitable flexible material such as rubber or the like. As illustrated more particularly in Fig. 1 of the drawing, the disk 15 is provided with a centrally located aperture 29 and four symmetrically spaced apertures 30 arranged in diametrically opposed pairs, the apertures 30 being equidistant from the center of the disk.

The driving and driven spiders 13 and 14, respectively, are secured to the disk 15 by means of specially conformed studs or the like 31, one of such studs being secured to each opposed arm of the spiders, adjacent the extremity thereof. It will be understood that the distance between the opposed studs 31 on each spider is substantially identical to the distance between each pair of opposed apertures 30 in the disk 15 whereby the studs are located for convenient assembly with the related apertures and that the points of attachment of the arms of the spiders and the disk are approximately 90 degrees apart. Moreover, the studs 31 on the spider 13 are located on the opposite side of said spider from the hub or project downwardly therefrom; complementarily, the studs 31 on the driven spider 14 project upwardly therefrom or in a direction toward the studs of the driving spider 13.

Each stud 31 includes an enlarged head portion 32 and a reduced stem portion 33 located on the extremity of the stud remote from said enlarged head portion. To prevent separation between the studs 31 and the associated spiders, the extremity of each reduced stem portion which is receivable within a suitable aperture in the spider and may project therethrough is suitably swaged or peened over as is well-known in this art. Or, if desired, any other means of assembly of studs and spiders may be provided as, for example, a screw-threaded relationship or the like.

The flexible material from which the disk 15 is manufactured permits of particularly convenient assembly and/or disassembly between said disk and the two spiders. As indicated more clearly in Fig. 5 of the drawing, the inherent flexibility of the disk permits of the ready distortion of an edge thereof by application of slight stretching force whereby the aperture 30 may be enlarged or distorted to permit movement in the direction indicated by the arrow for forcible separation or passing over the head 32 of the stud 31; the inherent resiliency of the material of the disk insures the return thereof to preformed shape wherein inadvertent separation as between disk and studs is prevented, the diameter of each aperture 30 being substantially identical to the diameter of each stud 31 to insure a snug and secure engagement therebetween. Further, during the assembly of the coupling, no consideration need be given as to which pair of apertures is engaged by the studs 31 of either the driving or driven spider, it being only necessary to pass the studs of one spider through one pair of apertures and the remaining pair of apertures becoming available for the studs of the other spider.

For disassembly of the coupling, for purposes of repair, replacement of the disk 15, or for whatever reason, it is merely necessary to remove each stud 31 from its associated aperture 30 and the disk is free for removal with the coupling separated without any requirement for use of tools, skilled labor, or any operation of a laborious character.

Several different methods of use are possible, to suit the given conditions or requirements of any particular installation. If desired, the coupling disk may be assembled with the two spiders and then secured to the extremity of the driven shaft by the use of a screw driver or the like passing through the hub 18 of the spider 13 and the centrally located aperture 27 in the disk to reach the extremity of the machine screw or fastening element 25. Thereafter the driving shaft 11 may be inserted in the hub 18 and the set screw 21 tightened against the flattened surface 22 of the drive shaft to securely couple driving and driven shafts in operative relationship. Since no hub is required upon the driven spider 14, the bearings (not shown) which support the two shafts may be positioned relatively close together to provide an extremely compact assembly. The relatively soft or flexible material from which the disk 15 is formed permits of any required distortion of such disk, within reasonable limits, and serves as a sound insulating or damping medium to prevent any transmission of mechanical noises between the two shafts. It will be understood, however, that the disk 15 is sufficiently rigid to transmit the necessary torque between driving and driven spiders.

As an alternate method of assembly, the spider 14 may be secured to the extremity of the driven shaft 12 and the hub 18 of the driving spider may be secured upon the extremity of the motor or drive shaft. Proper positioning may then be effected between driving and driven shafts without any interference, the opposed extremities of such shafts being free from each other, following which the disk 15 may be positioned between the ends of the two shafts and then engaged with the studs 31.

It will thus be readily apparent that there has been provided by the present invention a particularly simple and inexpensive flexible coupling which accomplishes the desired results enumerated hereabove and furnishes a solution to problems which have long vexed the art with which we are here concerned.

It will be obvious to those skilled in this art that various changes may be made in the invention without departing from the spirit and scope thereof, and therefore the invention is not limited by that which is shown in the drawing and described in the specification but only as indicated in the appended claims.

What is claimed is:

1. A flexible coupling for connecting a driving shaft and a driven shaft comprising a driving spider having a central portion and arms extending therefrom, means for securing said driving spider to said driving shaft, a driven spider having a central portion and arms extending therefrom, fastening means for securing the extremity of said driven shaft to said driven spider, a disk of relatively soft flexible material disposed between said spiders, and means for detachably securing the arms of both spiders to said disk, said means comprising a stud carried by each arm of each spider and projecting through a complementarily located aperture in said disk, each stud having an enlarged head to prevent inadvertent separation between said studs and said disk, each enlarged head being secured in fixedly spaced relation to its supporting arm and the head being spaced from the arm by a distance substantially equal to the thickness of the disk whereby the disk may be applied and removed from said studs.

2. A flexible coupling for connecting a power shaft and a driven shaft comprising a driving spider having diametrically opposed radial arms, means for securing said driving spider to said power shaft, a driven spider having diametrically opposed radial arms, means for securing said driven spider to said driven shaft, a disk of flexible material disposed between said spiders and detachably secured thereto, and a stud carried by each of the arms of said spiders adjacent the free extremity thereof and projecting through a complementarily located aperture in said disk, the diameter of each stud and its associated aperture being substantially identical for relatively snug engagement therebetween, each stud having an enlarged head to prevent inadvertent separation between said studs and disk, each enlarged head being secured in fixedly spaced relation to its supporting arm and the head being spaced from the arm by a distance substantially equal to the thickness of the disk whereby the disk may be applied and removed from said studs, the flexible material of said disk being such as to permit ready distortion to permit the passage of the enlarged head of a stud through its associated aperture.

References Cited in the file of this patent

UNITED STATES PATENTS

| Number | Name | Date |
| --- | --- | --- |
| 1,881,393 | Wood | Oct. 4, 1932 |
| 1,887,538 | Bond | Nov. 15, 1932 |
| 2,173,226 | Blain | Sept. 19, 1939 |